United States Patent [19]

Takebayashi et al.

[11] Patent Number: 5,752,099
[45] Date of Patent: May 12, 1998

[54] OPTICAL UNIT FOR DETECTING A FOCUS STATE

[75] Inventors: Tatsuhide Takebayashi; Takayuki Sensui, both of Tokyo, Japan

[73] Assignee: Asahi Kogaku Kogyo Kabushiki Kaisha, Tokyo, Japan

[21] Appl. No.: 708,947

[22] Filed: Sep. 6, 1996

[30] Foreign Application Priority Data

Sep. 11, 1995 [JP] Japan ................................ 7-233063

[51] Int. Cl.⁶ .................................................. G03B 13/36
[52] U.S. Cl. ...................................................... 396/114
[58] Field of Search ................................. 396/111, 114;
250/201.2, 201.7, 201.8

[56] References Cited

U.S. PATENT DOCUMENTS

| | | |
|---|---|---|
| 4,247,763 | 1/1981 | Stauffer . |
| 4,367,922 | 1/1983 | Lipkins . |
| 4,644,632 | 2/1987 | Mächler et al. . |
| 4,869,582 | 9/1989 | Nakajima et al. . |
| 4,901,102 | 2/1990 | Karasaki et al. . |
| 5,301,060 | 4/1994 | Niikawa et al. . |
| 5,321,248 | 6/1994 | Sensui . |
| 5,397,887 | 3/1995 | Sensui . |
| 5,420,438 | 5/1995 | Sensui et al. . |
| 5,477,303 | 12/1995 | Goto ................................ 396/114 |
| 5,530,236 | 6/1996 | Sensui . |

FOREIGN PATENT DOCUMENTS

| | | |
|---|---|---|
| 1155308 | 6/1989 | Japan . |
| 2-58012 | 2/1990 | Japan . |
| 7-72380 | 3/1995 | Japan . |
| 1342926 | 1/1974 | United Kingdom . |
| 1521270 | 8/1978 | United Kingdom . |
| 2018083 | 10/1979 | United Kingdom . |
| 2095500 | 9/1982 | United Kingdom . |
| 2231676 | 11/1990 | United Kingdom . |
| 2260200 | 4/1993 | United Kingdom . |
| 2279843 | 1/1995 | United Kingdom . |

OTHER PUBLICATIONS

Copy of a United Kingdom Search Report issued in counterpart application No. 9618859.4.
Copy of a United Kingdom Search Report issued with UK Application No. 9618859.4.

*Primary Examiner*—W. B. Perkey
*Attorney, Agent, or Firm*—Greenblum & Bernstein P.L.C.

[57] ABSTRACT

An optical unit for detecting a focus state. The optical unit has a focus detection zone restricting plate having a plurality of openings arranged in a first pattern in a vicinity of a predetermined focal plane on which an object image is formed. A sensor unit having a plurality of sensor sections is arranged in a second pattern, different to the first pattern, in a vicinity of an image reforming surface on which the object image is reformed. A plurality of mirrors deflect light transmitted through the plurality of openings arranged in the first pattern toward the plurality of sensor sections so as to have a direction identical to a direction of the second pattern of the plurality of sensor sections. The plurality of openings and the plurality of sensor sections are provided on a body of the optical unit. The plurality of mirrors are provided on members separate from the body of the optical unit. The reflecting surfaces of the plurality of mirrors are positioned by bringing the reflecting surfaces into contact with reference surfaces formed on the body of the optical unit.

8 Claims, 6 Drawing Sheets

OPTICAL UNIT FOR DETECTING A FOCUS STATE

BACKGROUND OF THE INVENTION

1. Field of the Invention

The present invention relates to an optical unit for detecting a focus state in a camera having a positioning mechanism for a plurality of mirrors located in different planes, and more precisely, relates to an improved mirror structure thereof.

2. Description of the Related Art

Generally in known passive multi-focus detecting systems, the arrangement (pattern) of focus detection zones corresponds to the arrangement (pattern) of sensor sections of a line sensor. For example, in a focus state detecting system disclosed in Japanese Unexamined Patent Publication No. 1-155308 or No. 2-58012, the arrangement of focus detection zones on a predetermined focal surface is identical to the arrangement of sensor sections of a line sensor provided on an image reforming surface on which an image is reformed. Consequently, the focus detection zones can not be freely arranged independent from the sensor sections of the line sensor, and vice versa.

To this end, the assignee of the present application has proposed, in U.S. Ser. No. 08/272,050, an improved focus state detecting system in which the arrangement of focus detection zones is different from the arrangement of corresponding sensor sections of the line sensor. In this focus state detecting system, a plurality of mirrors, namely five mirrors, are located in different planes. The mirrors, which are made of a glass material, are independently produced, positioned and secured, thus increasing production time and cost.

SUMMARY OF THE INVENTION

It is an object of the present invention to provide a focus detection optical unit in which the positioning of a plurality of mirrors whose reflection surfaces are located in different planes can be easily, precisely and inexpensively carried out.

To achieve the object mentioned above, according to an aspect of the present invention, there is provided an optical unit for detecting a focus state. The optical unit includes a focus detection zone restricting plate having a plurality of openings arranged in a first pattern in a vicinity of a predetermined focal plane on which an object image is formed. A sensor unit is provided having a plurality of sensor sections arranged in a second pattern, different than the first pattern, in a vicinity of an image reforming surface on which the object image is reformed. A plurality of mirrors deflect light transmitted through the plurality of openings arranged in the first pattern, toward the plurality of sensor sections so as to have a direction identical to a direction of the second pattern of the plurality of sensor sections. The plurality of openings and the plurality of sensor sections are provided on a body of the optical unit. The plurality of mirrors are provided on members separate from the body of the optical unit. The reflecting surfaces of the plurality of mirrors are positioned by bringing the reflecting surfaces into contact with reference surfaces formed on the body of the optical unit.

With this arrangement, since the plurality of mirrors are provided on members separate from the body of the optical unit, the positioning of the reflecting surfaces of the mirrors can be carried out by bringing the reflecting surfaces into contact with reference surfaces formed on the body of the optical unit. Thus the mirrors can be easily and precisely positioned. Moreover, since the positioning of the mirrors is performed by surface contact between the reflecting surfaces of the mirrors and the reference surfaces, precise positioning can be achieved using a simple mechanism.

In another aspect of the present invention, a positioning mechanism for positioning a plurality of mirrors which are disposed in different planes on a stationary member is provided. The reflecting surfaces of the mirrors are brought into contact with positioning reference surfaces formed on the stationary member to determine the positions of the mirrors.

The present disclosure relates to subject matter contained in Japanese Patent Application No. 07-233063 (filed on Sep. 11, 1995) which is expressly incorporated herein by reference in its entirety.

BRIEF DESCRIPTION OF THE DRAWINGS

The present invention will be described below in detail with reference to the accompanying drawings, in which similar elements are indicated by similar reference numerals, and wherein.

DESCRIPTION OF THE PREFERRED EMBODIMENT

Figure 1:
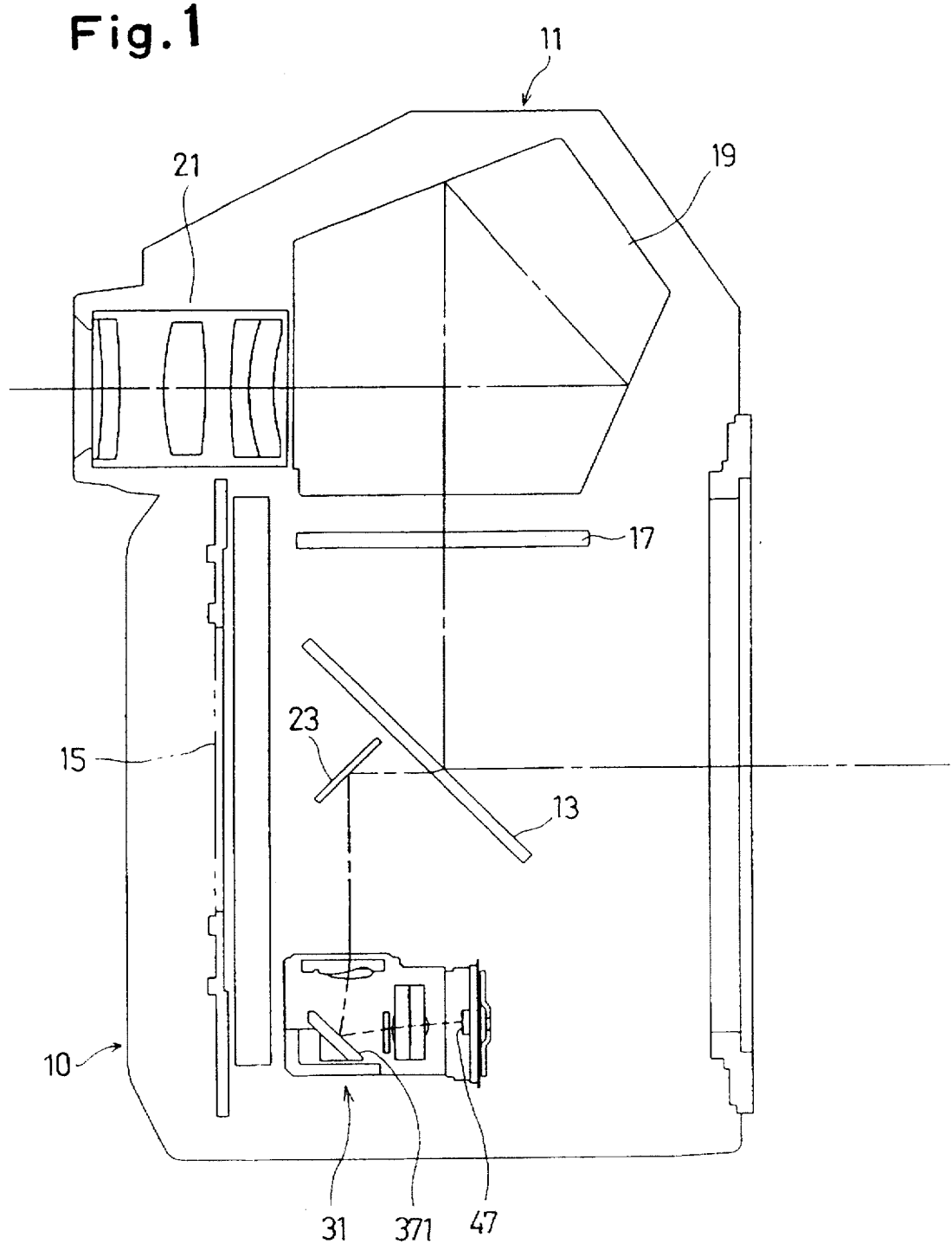
FIG. 1 is a sectional view of a single lens reflex camera having an automatic focus detection optical unit.

FIG. 1 shows a sectional view of a single lens reflex camera 10 having an automatic focus detection optical system. Light entering a body 11 of the camera 10 through a photographing lens (not shown) is partly reflected by a main mirror 13 before converging onto a focusing plate 17 to form an object image. The focusing plate 17 is located at a position conjugate with a film surface 15. The light subsequently passes through the focusing plate 17, a pentagonal prism 19 and an eyepiece 21, so that a photographer can view the object image formed on the focusing plate 17 as an erect image.

Part of the light incident upon the main mirror 13 is transmitted through the main mirror 13 and is reflected by an auxiliary mirror 23 toward an AF (autofocus) optical unit 31. In the illustrated embodiment, the AF optical unit 31 is a multiple AF unit having three focus detection zones, in which the arrangement of focus detection zones in a field of view is different from the arrangement of sensor sections of a line sensor. Namely, three focus detection zones are arranged together in a substantially "H" shaped pattern, while each sensor section of the line sensor is arranged substantially parallel to the longitudinal axis of the line sensor, namely arranged in the form "-". This aspect of the illustrated embodiment will be described in more detail hereinafter.

Figure 2:
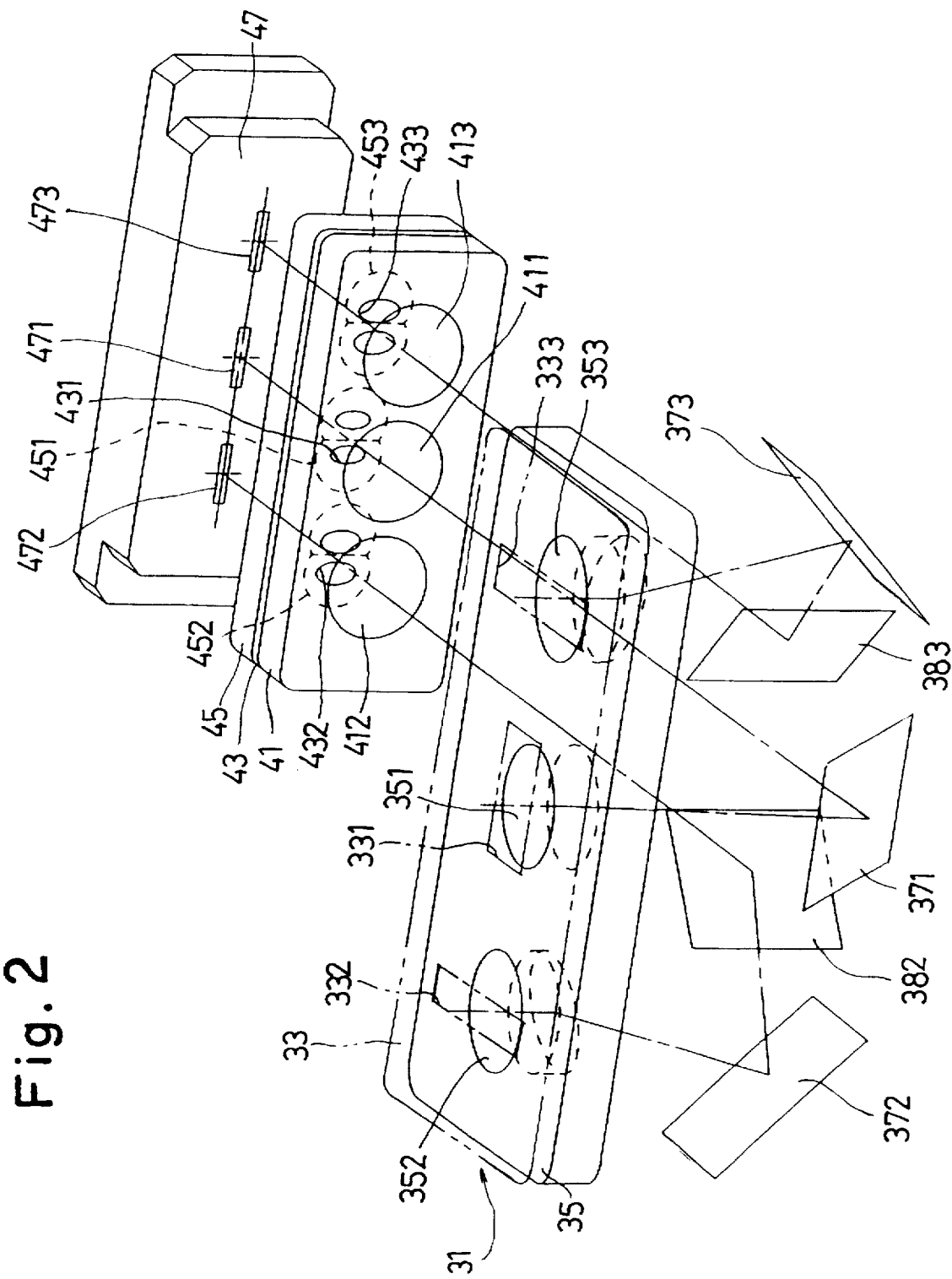
FIG. 2 is a perspective view of the optical unit shown in FIG. 1 illustrating an optical path.

As shown in FIG. 2, the AF optical unit 31 is provided with a cover (focus detection zone restricting plate) 33 having substantially rectangular openings 331 (central opening), 332 and 333 (first and second peripheral openings) in a predetermined focal plane (conjugate with the film surface 15), or in the vicinity thereof, to pickup a part of the object image. The openings 331, 332 and 333 are arranged together in a substantially "H" shaped pattern (first pattern). Each of the openings 331, 332 and 333 defines a focus detection zone. Namely, the focus state of the object light transmitted through the openings (focus detection zones) 331, 332 and 333 is detected.

The openings 331, 332 and 333 are located in the field of view. The central opening 331 which is located in the optical path of the photographing lens, is laterally elongated. Namely, the longitudinal axis of the central opening 331 is substantially parallel with the longitudinal axis of the cover 33. The two peripheral openings 332 and 333 located respectively on the left and right sides (as viewed in FIG. 2) of the central opening 331 are elongated in a direction substantially perpendicular to the longitudinal axis of the central opening 331.

A condenser lens 35 (lens elements 351, 352 and 353) is provided behind (below, as viewed in FIG. 2) the cover 33. The condenser lens 35 functions as a relay lens. Each lens element of the condenser lens 35, i.e., 351, 352 and 353, respectively corresponds to one of each of the openings 331, 332 and 333.

A central mirror 371 is provided behind the central opening 331. The central mirror 371 deflects object light transmitted through the central opening 331 and the condenser lens element 351 by 90°. A first inner peripheral mirror 382 and a first outer peripheral mirror 372 are provided behind the peripheral opening 332. The first inner and outer peripheral mirrors 382 and 372 each respectively deflect object light transmitted through the peripheral opening 332 and the condenser lens element 352 by 90°. Similarly, a second inner peripheral mirror 383 and a second outer peripheral mirror 373 are provided behind the peripheral opening 333. The second inner and outer peripheral mirrors 383 and 373 each respectively deflect object light transmitted through the peripheral opening 333 and the condenser lens element 353 by 90°.

The first inner and outer peripheral mirrors 382, 372 and the second inner and outer peripheral mirrors 383, 373 are adapted to rotate the object light about the optical axis by 90°. Namely, in the illustrated embodiment, since object images transmitted through the substantially rectangular focus detection zones defined by the peripheral openings 332 and 333 are rotated by 90° in clockwise and counter-clockwise directions, respectively, the object images thus obtained are aligned along a lateral line. Namely, the "H" shaped arrangement of the openings 331, 332 and 333 is optically equivalent to an arrangement thereof of a linear pattern ("-" pattern) owing to the deflection of the object light using the deflection mirrors (peripheral mirrors 372, 382 and 373, 383).

An auxiliary lens 41, a mask 43, a separator lens 45, and a line sensor 47 are provided, in this order, behind the central mirror 371 and the first and second inner peripheral mirrors 382 and 383. The auxiliary lens 41 consists of three lens elements 411, 412 and 413, each respectively corresponding to the openings 331, 332 and 333. Similarly, the mask 43 consists of three pairs of apertures 431, 432 and 433, each respectively corresponding to the openings 331, 332 and 333. The separator lens 45 consists of three pairs of separator lens elements 451, 452, 453. The line sensor 47 consists of three sensor sections 471, 472, 473. Note that an infrared filter 39 (FIG. 5) is provided in front of the lens elements 411, 412, and 413 of the auxiliary lens 41.

Each pair of separator lens elements 451, 452 and 453 is adapted to split the object light transmitted through the corresponding openings 331, 332 and 333 and reform object images. The three line sensor sections 471, 472 and 473 (photoelectric transducers) of the line sensor 47 are linearly aligned in the longitudinal direction of the line sensor 47 (second pattern) and spaced at a predetermined distance, so that object images corresponding to the openings 331, 332 and 333 are formed on the respective sensor sections 471, 472 and 473. Note that the line sensor 47 is housed in a CCD package 46 which is provided with a transparent cover 46a to protect the line sensor 47, a substrate 48 and a backing 49, etc. The transparent cover 46a is adhered at its front surface to a unit body 51 by means of a transparent resin or an adhesive, etc.

The cover 33, the condenser lens 35 (i.e., condenser lens elements 351, 352 and 353), the mirrors 371, 372, 373, 382 and 383, the infrared filter 39, the auxiliary lens 41 (i.e., auxiliary lens elements 411, 412 and 413) the mask 43 (i.e., the three pairs of apertures 431, 432 and 433), the separator lens 45 (i.e., the three separator lens elements 451, 452 and 453), and the line sensor 47 (i.e., the three sensor sections 471, 472 and 473), of the AF optical unit 31 are provided on the unit body 51.

According to one of the significant features of the illustrated embodiment, the mirrors 371, 382 and 383 are formed integral with a resin mirror block (first resin mirror block) 61, the mirrors 372 and 373 are formed integral with a resin mirror block (second resin mirror block) 71, and the (reflecting surfaces of the) mirrors 371, 372, 373, 382 and 383 are positioned by abutting against reference surfaces formed on the unit body 51. The reference surfaces are opposed to the respective mirrors 371, 372, 373, 382 and 383, and lie in extensions of planes in which the mirrors 371, 372, 373, 382 and 383 are to be positioned. This aspect of the present embodiment will be described in greater detail below, with reference to FIGS. 3 through 7.

Figure 3:
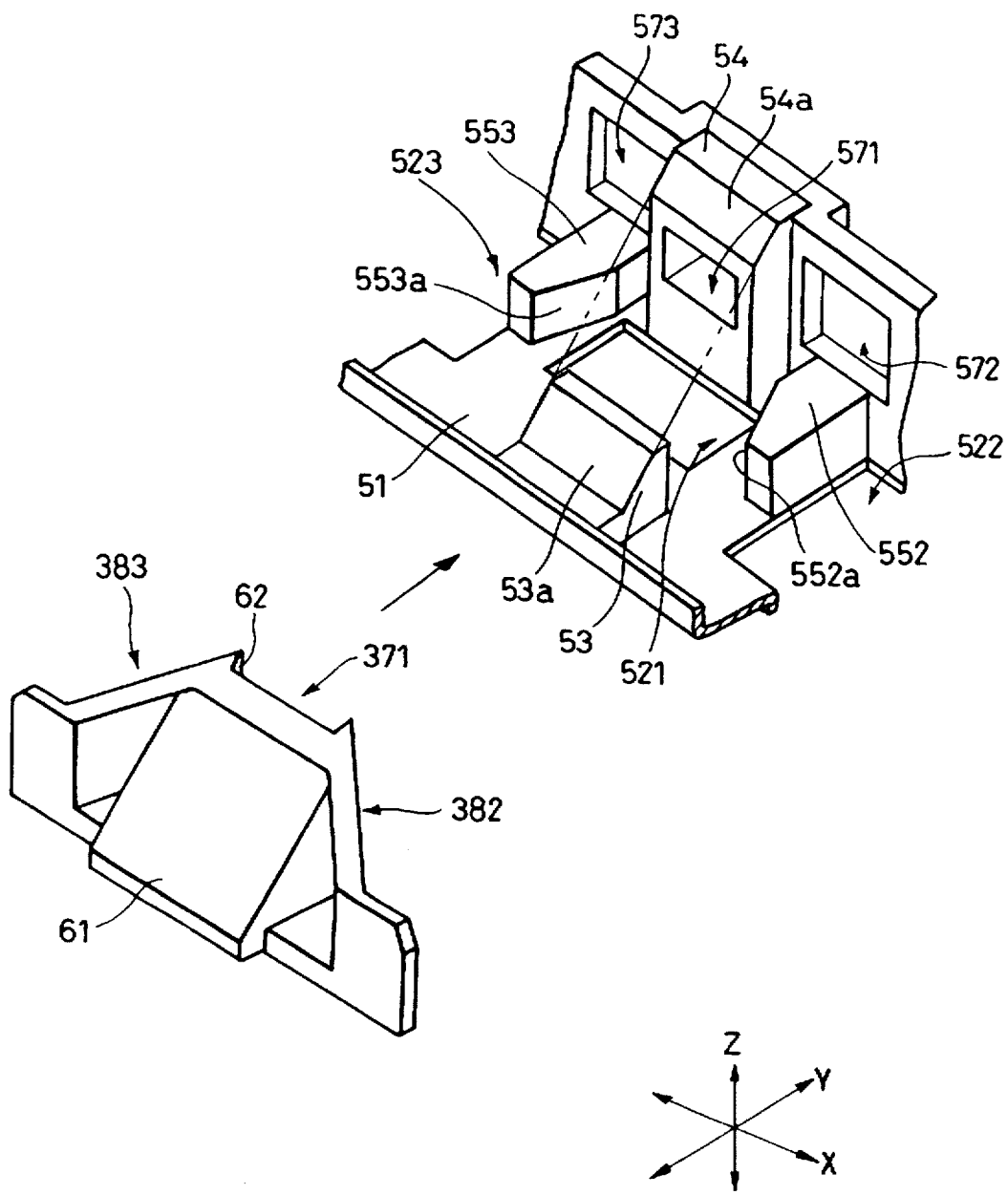
FIG. 3 is an exploded perspective view of a main part of an AF optical unit shown in FIG. 1, as viewed from a lower side.
Figure 4:
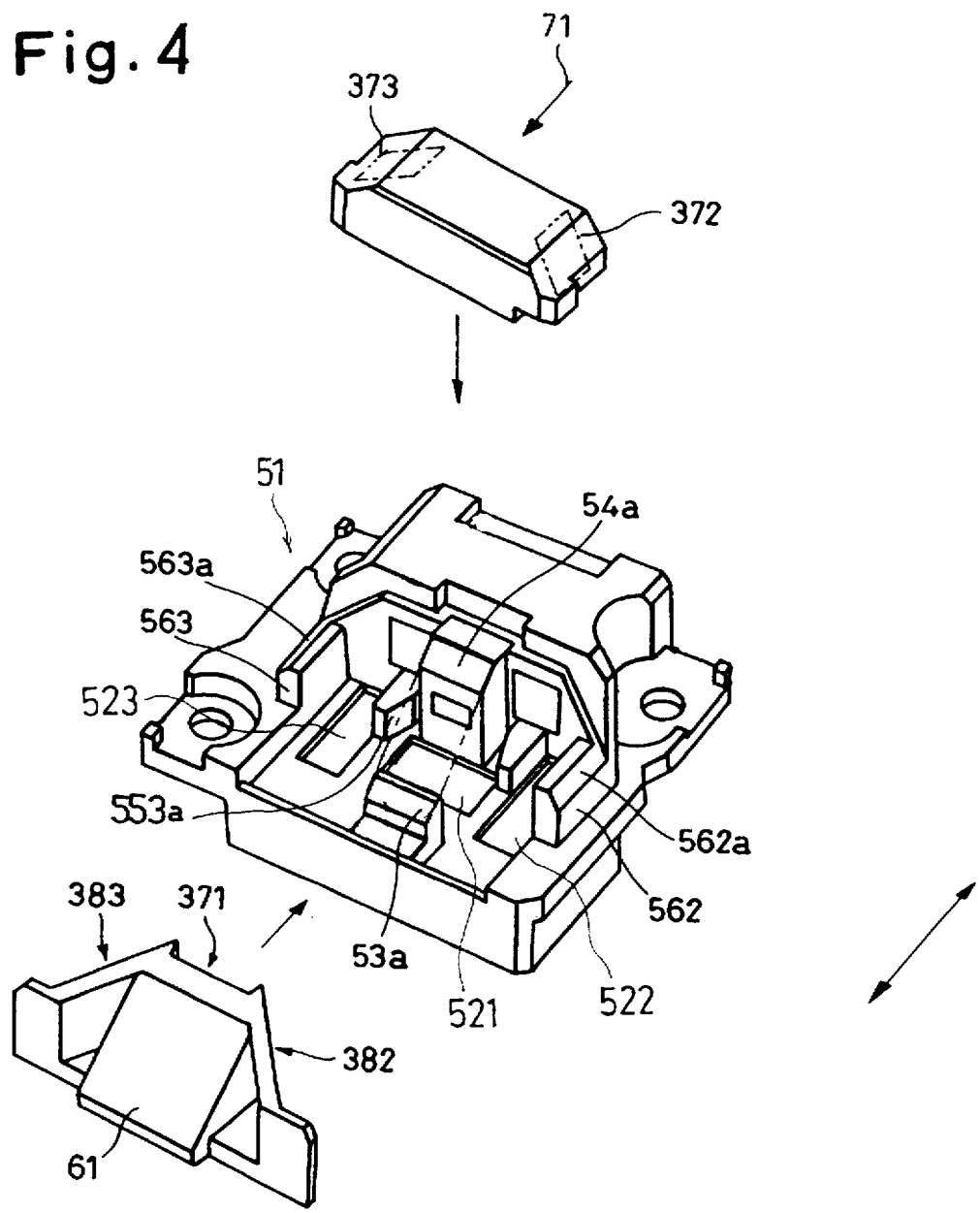
FIG. 4 is an exploded perspective view of the AF optical unit shown in FIG. 1, as viewed from a lower side.
Figure 5:
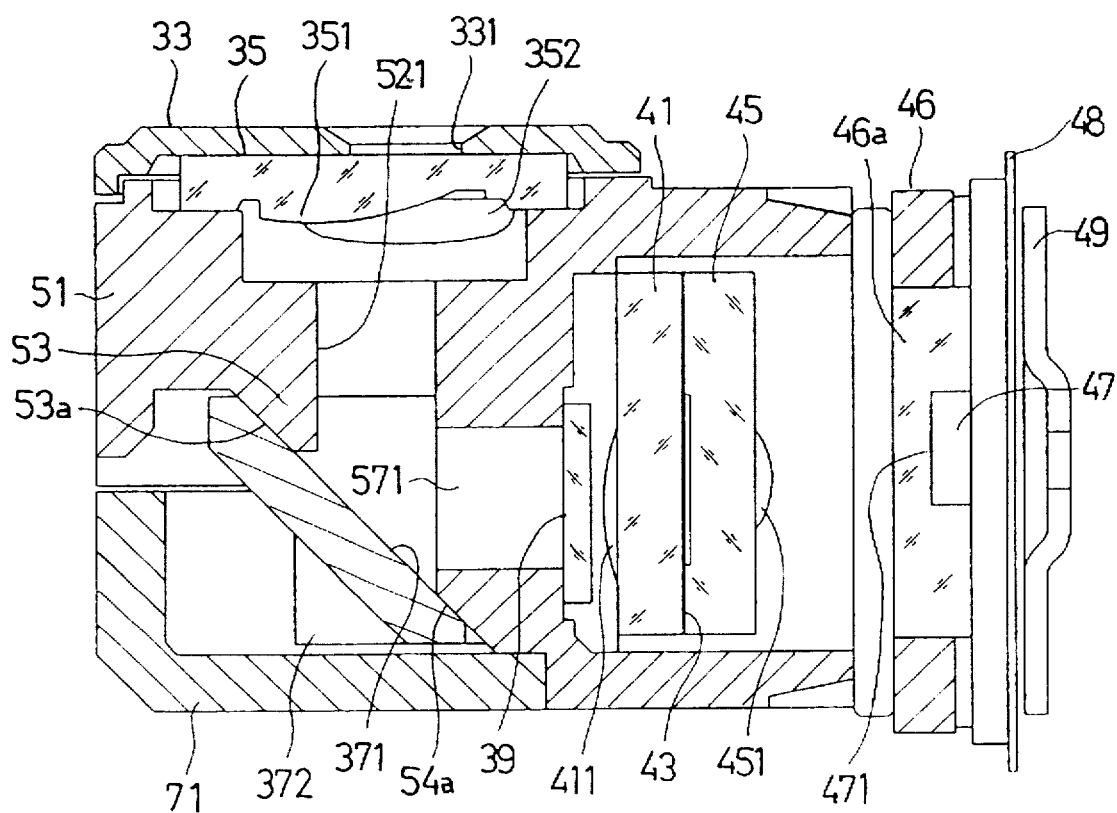
FIG. 5 is a longitudinal sectional view of an assembly of the AF optical unit.
Figure 6:
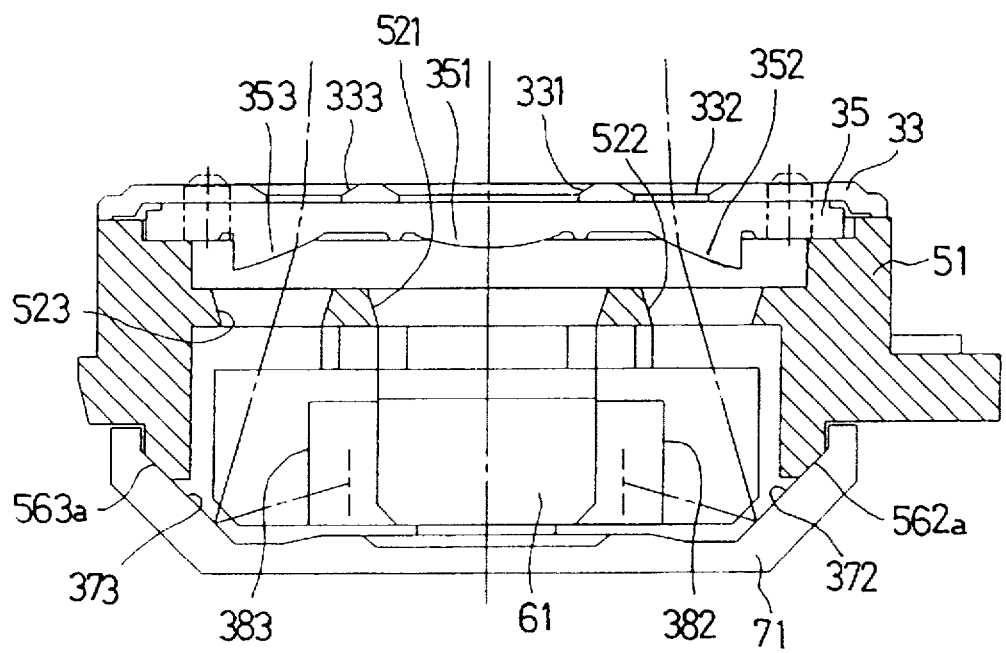
FIG. 6 is a cross-sectional view of an assembly of the AF optical unit.
Figure 7:
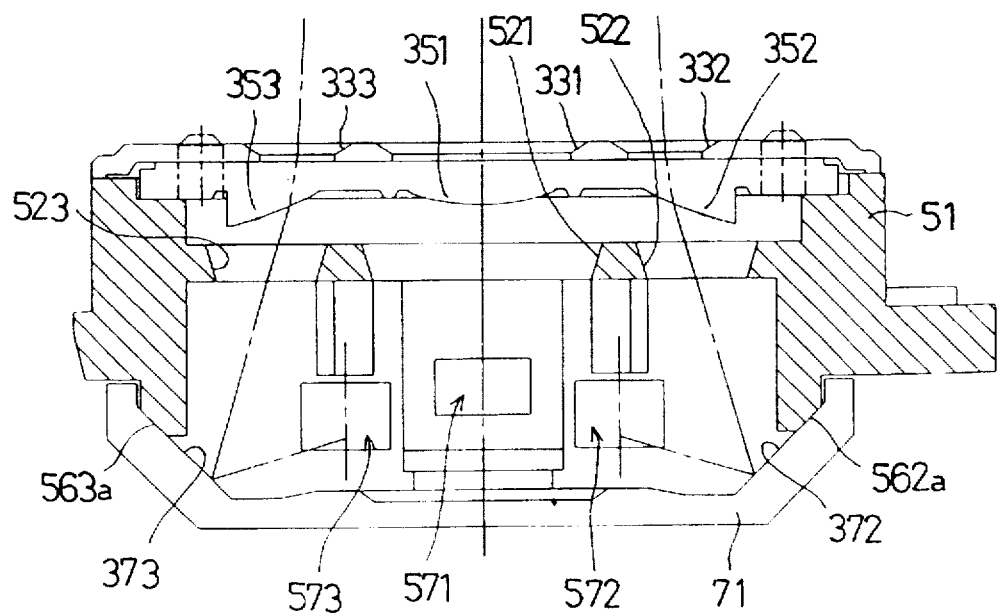
FIG. 7 is a cross-sectional view of an assembly of the AF optical unit, when a first resin mirror block is removed.

FIGS. 3 and 4 show exploded perspective views of the AF optical unit 31, viewed from a lower side. FIG. 5 is a longitudinal sectional view of an assembly of the AF optical unit 31, taken along the optical axis extending from the central condenser lens 351 to the central sensor section 471. FIG. 6 is a cross-sectional view of the AF optical unit 31 having the resin mirror blocks 61 and 71 mounted thereto, taken along a plane including the optical axes of the condenser lens elements 351, 352 and 353. FIG. 7 is a cross-sectional view of the AF optical unit 31 when the resin mirror block 61 is not mounted thereto, taken along a plane including the optical axes of the condenser lens elements 351, 352 and 353.

The unit body 51 is provided with incident windows (entrance windows) 521, 522 and 523 respectively corresponding to the focus detection zones (openings) 331, 332 and 333 and the condenser lens elements 351, 352 and 353. The unit body 51 is also provided with a mask 57 having emission windows 571, 572 and 573, respectively corresponding to the sensor sections 471, 472 and 473. The incident windows 521, 522 and 523 and the emission windows 571, 572 and 573 are positioned in orthogonal planes.

The cover 33 is attached to the camera body 11 outside the entrance windows 521, 522 and 523, so that the condenser lens 35 is positioned between the cover 33 and the entrance windows 521, 522 and 523. The infrared filter 39, the auxiliary lens 41, the mask 43, the separator lens 45, and the line sensor 47 are located outside the emission windows 571, 572 and 573. The mirrors 371, 372, 373, 382 and 383 are arranged in the light path between the emission windows 571, 572 and 573 and the entrance windows 521, 522 and 523.

The light incident upon the central focus detection zone 331 is condensed by the condenser lens 351, passed through the entrance window 521 and reflected by the central mirror 371. Subsequently, the light is emitted from the emission window 571, passed through the infrared filter 39, the auxiliary lens 411, and the aperture 431 (FIG. 2). The light is then split by the separator lens element 451, and is converged onto the central sensor section 471 of the line sensor 47, as can be seen in FIG. 5.

The three mirrors 371, 382 and 383 are formed on the first resin mirror block 61. The first resin mirror block 61 has an abutting portion 62 formed at an upper portion thereof. The two mirrors 372 and 373 are formed on the second resin mirror block 71. The reflecting surfaces of the mirrors 371, 372, 373, 382 and 383 are made of a reflecting member, such as an aluminum layer formed thereon, by vapor deposition.

The unit body 51 is provided with a pair of reference surfaces 53a and 54a formed on opposite sides of the entrance window 521. The surfaces 53a and 54a serve as positioning surfaces with which the central mirror 371 of the first resin block 61 comes into contact. The surfaces 53a and 54a restrict the movement of the central mirror 371 in a direction normal to the surfaces 53a and 54a. Also, the unit body 51 is provided with a pair of reference surfaces 552a and 553a. The surfaces 552a and 553a serve as positioning surfaces with which the first and second inner peripheral mirrors 382 and 383 come into contact. The surfaces 552a and 553a restrict the movement of the peripheral mirrors 382 and 383 in the direction normal thereto. When the mirrors 371, 382 and 383 respectively abut against the reference surfaces 53a, 54a, 552a and 553a, the positions of the mirrors 371, 382 and 383, in normal line directions thereof, are precisely determined. No movement of the mirrors 371, 382 and 383 along the reflecting surfaces occurs due to the contact of the mirrors with the reference surfaces 53a, 54a, 552a, and 553a.

Note that the reference surfaces 53a, 54a, 552a and 553a are respectively formed on side or upper surfaces of projecting ribs 53, 54, 552 and 553 formed integrally with the unit body 51 in the vicinity of the emission window 571, so that the portions of the mirrors 371, 382 and 383 other than the effective reflecting surfaces thereof can be brought into contact with the reference surfaces 53a, 54a, 552a, and 553a. In addition, the abutting surface 62 of the first resin mirror block 61 can be brought into contact with the projecting rib 54, so as to restrict a forward movement (i.e., a movement toward the right hand side of FIG. 3) of the first resin mirror block 61.

The unit body 51 is also provided with a pair of reference surfaces 562a and 563a. The surfaces 562a and 563a serve as positioning surfaces with which the first and second outer peripheral mirrors 372 and 373 of the second resin block 71 come into contact to restrict the movement of the mirrors 372 and 373 in the normal line direction thereof. When the mirrors 372 and 373 respectively abut against the reference surfaces 562a and 563a, the positions of the mirrors 372 and 373 in the normal line directions thereof are precisely determined.

The reference surfaces 562a and 563a are formed on the projecting ribs 562 and 563 respectively, integrally with the unit body 51, so that the portions of the mirrors 372 and 373 other than the effective reflecting surfaces thereof can be brought into contact with the reference surfaces 562a and 563a.

The second resin mirror block 71 is mounted to the unit body 51 to cover the first resin block 61, i.e., the second resin block 71 is positioned above the first resin block 61, with the first and second outer peripheral mirrors 372 and 373 coming into contact with the reference surfaces 562a and 563a, respectively, after the first resin mirror block 61 has been mounted to the unit body 51 at a predetermined position. The resin mirror blocks 61 and 71 are secured to the unit body 51 by means of an adhesive or the like.

Although the mirrors are divided into two groups which are integral, i.e., a first group consisting of the central mirror 371 and the first and second inner peripheral mirrors 382, 383, and a second group consisting of the first and second outer peripheral mirrors 372, 373, in the illustrated embodiment, the present invention is not limited thereto. Namely, it is possible to divide the mirrors into three groups which are made integral, i.e., a first group consisting of the central mirror 371, a second group consisting of the first inner and outer peripheral mirrors 382 and 372, and a third group consisting of the second inner and outer peripheral mirrors 383 and 373.

Although in the illustrated embodiment, the focus detection zones are arranged in a "H" shape, and the sensor sections are arranged linearly ("-" pattern), the present invention is not limited thereto. Moreover, the number of focus detection zones is not limited to three, and can be two or more than three.

As can be understood from the above discussion, since a plurality of mirrors which are disposed in different planes are provided on members separate from a unit body, the positioning of reflecting surfaces of the mirrors can be carried out by bringing the reflecting surfaces into contact with positioning reference surfaces provided on the unit body, thus the mirrors can be easily and precisely positioned.

Moreover, according to the present invention, since the positioning of the mirrors, which are placed in different planes, is performed by surface contact between the reflecting surfaces of the mirrors and the reference surfaces, precise positioning can be achieved using a simple mechanism.

What is claimed is:

1. An optical unit for detecting a focus state, comprising:
   a focus detection zone restricting plate having a plurality of openings arranged in a first pattern in a vicinity of a predetermined focal plane on which an object image is formed;
   a sensor unit having a plurality of sensor sections arranged in a second pattern different from said first pattern, in a vicinity of an image reforming surface on which said object image is reformed; and
   a plurality of mirrors which deflect light transmitted through said plurality of openings arranged in said first pattern toward said plurality of sensor sections so said light has an orientation identical to an orientation of said second pattern of said plurality of sensor sections,
   wherein said plurality of openings and said plurality of sensor sections are provided on a body of said optical unit, said plurality of mirrors being provided on members distinct from said body of said optical unit, reflecting surfaces of said plurality of mirrors being positioned by bringing said reflecting surfaces into contact with a plurality of reference surfaces formed on said body of said optical unit.

2. The optical unit for detecting a focus state according to claim 1, wherein said first pattern is substantially in the form of an "H" shaped pattern, and said second pattern is a substantially linear pattern.

3. The optical unit for detecting a focus state according to claim 2, wherein said plurality of openings include first and second substantially rectangular peripheral openings and a central substantially rectangular opening provided in between said first and second peripheral openings, said central opening and said first and second peripheral openings being arranged together in said "H" shaped pattern on said focus detection zone restricting plate, and said plurality of sensor sections include three substantially rectangular sensor sections arranged in said substantially linear pattern on said sensor unit.

4. The optical unit for detecting a focus state according to claim 3, wherein said plurality of mirrors includes a central mirror, a first inner peripheral mirror, a second inner peripheral mirror, a first outer peripheral mirror and a second outer peripheral mirror, said central mirror being positioned between said first inner and outer peripheral mirrors and said second inner and outer peripheral mirrors.

5. The optical unit for detecting a focus state according to claim 4, wherein said central mirror reflects object light transmitted through said central opening toward a corresponding central sensor section of said three substantially rectangular sensor sections, and said first inner and outer peripheral mirrors and said second inner and outer peripheral mirrors respectively reflect and rotate object light transmitted through said first and second peripheral openings of said three substantially rectangular openings.

6. The optical unit for detecting a focus state according to claim 5, wherein said central mirror, said first inner and outer peripheral mirrors, and said second inner and outer peripheral mirrors are provided with reflecting surfaces which come into contact with said plurality of reference surfaces formed on said body of said optical unit to determine positions of said mirrors.

7. The optical unit for detecting a focus state according to claim 6, wherein said central mirror and said first and second inner peripheral mirrors are integrally formed on a first synthetic resin member and said first and second outer peripheral mirrors are integrally formed on a second synthetic resin member.

8. The optical unit for detecting a focus state according to claim 6, wherein said reflecting surfaces are made of an aluminum layer formed on said mirrors.

* * * * *